United States Patent [19]

Tatsumi

[11] Patent Number: 4,524,645

[45] Date of Patent: Jun. 25, 1985

[54] SPEED CHANGE CONTROL UNIT OF AUTOMATIC TRANSMISSION FOR AUTOMOBILES UTILIZING FLUID FLOW RATE

[75] Inventor: Takumi Tatsumi, Himeji, Japan

[73] Assignee: Mitsubishi Denki Kabushiki Kaisha, Tokyo, Japan

[21] Appl. No.: 455,530

[22] Filed: Jan. 4, 1983

[30] Foreign Application Priority Data

Jan. 14, 1982 [JP] Japan ................................ 57-5615

[51] Int. Cl.³ .............................................. B60K 41/06
[52] U.S. Cl. ....................................... 74/866; 74/861; 74/867
[58] Field of Search ................. 74/866, 867, 868, 843, 74/844, 869, 861, 864, 865; 192/3.57, 3.58, 87.12, 87.13, 87.18; 73/861.01, 861.02, 861.78, 861.79; 364/424.1

[56] References Cited

U.S. PATENT DOCUMENTS

| 2,436,683 | 2/1948 | Wood, Jr. | 73/861.78 X |
|---|---|---|---|
| 3,006,213 | 10/1961 | Wilson | 74/472 |
| 3,394,622 | 7/1968 | Chana | 74/867 |
| 3,448,640 | 6/1969 | Nelson | 74/866 |
| 3,738,193 | 6/1973 | Sumiyoshi et al. | 74/866 |
| 3,789,963 | 2/1974 | Baily et al. | 192/3.57 |
| 3,855,880 | 12/1974 | Ishimaru et al. | 74/868 |
| 3,866,469 | 2/1975 | Wemyss | 73/861.87 |
| 3,996,800 | 12/1976 | Rosso | 73/861.78 |
| 4,199,048 | 4/1980 | Ishikawa | 192/3.57 X |
| 4,262,335 | 4/1981 | Ahlen et al. | 74/866 X |
| 4,337,655 | 7/1982 | Sundstrom et al. | 73/861.77 X |
| 4,438,666 | 3/1984 | Lane | 74/868 |

Primary Examiner—Leslie A. Braun
Assistant Examiner—Dwight G. Diehl
Attorney, Agent, or Firm—Wenderoth, Lind & Ponack

[57] ABSTRACT

A speed change control unit of an automatic transmission for automobiles including a hydraulic servo for achieving speed change operations electrically and hydraulically controlled depending upon the operating state of an engine. The flow rate of working oil for the servo having a substantially constant pressure applied thereto and flowing through an orifice is detected so as to control the operating speed of the hydraulic servo in accordance with the flow rate, whereby changes in the characteristics of the hydraulic servo ascribable to the temperature change and quality fluctuation of the working oil of the transmission can be thereby compensated for so as to ensure a smooth speed change operation at all times.

3 Claims, 3 Drawing Figures

SPEED CHANGE CONTROL UNIT OF AUTOMATIC TRANSMISSION FOR AUTOMOBILES UTILIZING FLUID FLOW RATE

BACKGROUND OF THE INVENTION

The present invention relates to the speed change control unit of an automatic transmission for automobiles. In general, in a transmission for automobiles based on electric and hydraulic controls, the car speed, the throttle opening, etc., are electrically detected, the optimum gear shift stage is determined depending upon the running conditions of the automobile, and predetermined solenoid valves are operated in accordance with the output, so as to selectively operate a plurality of hydraulic servo means composed of clutches or brakes, while an oil pressure to be applied to the hydraulic servo is electrically controlled depending upon the driving state of the automobile so as to adjust the engaging or releasing speed of the hydraulic servo, whereby a speed change operation is achieved while the shock occasioned by the switching of transmission gear ratios is being moderated.

The speed change operation needs to be smoothly effected in all the driving states of the automobile. Since, however, the driving states of the automobile change largely, it is very difficult to hold an ideal speed change operation in correspondence with such changes at all times.

It is of special importance that a temperature change varies the characteristics of the working oil of the hydraulic servo greatly. Therefore, such a temperature change has a great influence on the operating characteristics of the hydraulic servo and is one cause for making it difficult to always realize the smooth speed change operation.

SUMMARY OF THE INVENTION

This invention has been made in view of the aforementioned points, and has for its object to provide a speed change control unit of an automatic transmission for automobiles, wherein the flow rate at which working oil held at a substantially constant pressure flows through a fixed orifice or a corresponding oil passage is measured so as to detect the change of a flow resistance attendant upon the temperature change of the working fluid, and the oil pressure to be applied to a hydraulic servo is adjusted on the basis of the detected value, whereby not only fluctuations in operating characteristics attendant upon the temperature change of the working oil, but also changes in the performance dispersion and secular variation of the working oil can be compensated for, and a constant favorable speed change operation can be achieved at all times.

BRIEF DESCRIPTION OF THE DRAWINGS

In the drawings, the same symbols indicate the same or corresponding parts.

DESCRIPTION OF THE PREFERRED EMBODIMENT

Figure 1:
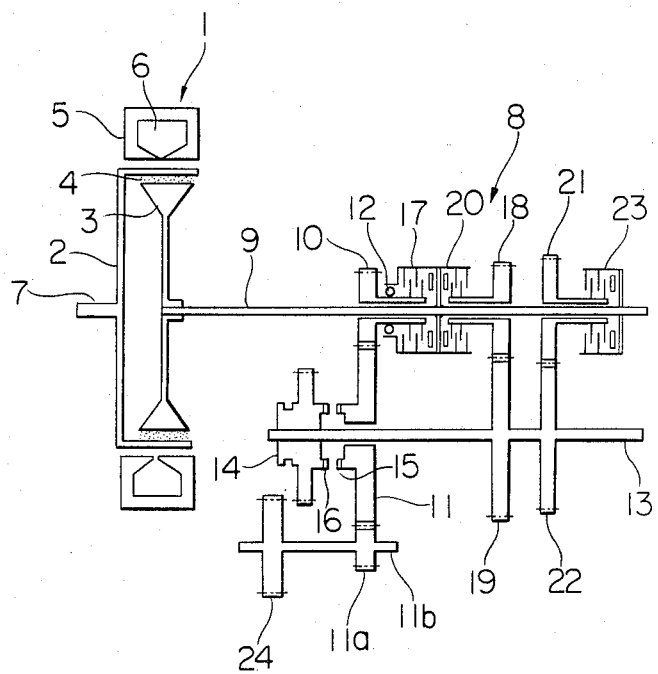
FIG. 1 is an explanatory view of the structure of an automatic transmission for automobiles which is applied to an embodiment of the speed change control unit of an automatic transmission for automobiles according to this invention.

Referring now to the drawings, an embodiment of the speed change control unit of an automatic transmission for automobiles according to this invention will be described. FIG. 1 is a view of an example of an automatic transmission having three forward speed gear ratios for explaining the embodiment.

In FIG. 1, numeral 1 designates an electromagnetic clutch, and numeral 8 designates a speed change gear mechanism. Of them, the electromagnetic clutch 1 is constructed as stated below. A drive member 2 is fixed to the crank shaft 7 of an engine, and a yoke 5 is disposed on the outer peripheral side of the drive member 2. An annular exciting coil 6 is disposed in a manner to be enclosed by the yoke 5.

Inside the drive member 2, a driven member 3 is opposed to the exciting coil 6 as well as the yoke 5 with magnetic powder 4 intervening therebetween. The magnetic powder 4 is loosely packed in an annular gap which is defined between the drive member 2 and the driven member 3, so that a torque which is substantially proportional to an exciting current flowing through the exciting coil 6 is transmitted from the drive member 2 to the driven member 3.

The central part of the driven member 3 is spline-fitted on one end of the input shaft 9 of the speed change gear mechanism 8, so that the input shaft 9 and the driven member 3 rotate unitarily.

Next, the construction of the speed change gear mechanism 8 will be described. In the first speed stage, one-way clutch 12 is disposed on the outer peripheral side of the input shaft 9, so that the turning force of the input shaft 9 is transmitted to one first speed gear 10 by the one-way clutch 12. A second first gear 11 is held in mesh with the gear 10. Accordingly, the turning force of the input shaft 9 is transmitted to the first speed gear 11 through the gear 10 as well as the one-way clutch 12.

The first speed gear 11 is slidingly fitted on an output shaft 13, on which a slide gear 14 is spline-fitted. The slide gear 14 is adapted to slide in the axial direction of the output shaft 13 in interlocking with the operation of a selector switch to be described below.

The opposing parts of the slide gear 14 and the first speed gear 11 are respectively provided with meshing teeth 15 and 16. When the slide gear 14 has slid in the axial direction of the output shaft 13, the mesh teeth 15 and 16 come into mesh, whereby the turning force of the first speed gear 11 is transmitted to the output shaft 13 through the slide gear 14.

In addition, a gear 11a is held in mesh with the first speed gear 11, and it is connected with a shaft 11b. A reverse gear 24 is also connected with the shaft 11b. The reverse gear 24 is adapted to mesh with the slide gear 14.

The output shaft 13 drives the wheels of the automobile through known differential gears, not shown.

On the other hand, numeral 17 indicates a first speed clutch which is disposed in parallel with the one-way clutch 12 and which is hydraulically actuated to effect engagement or release for the power transmission between the input shaft 9 and the gear 10. Thus, the one-way clutch 12 is locked by the engagement of the first speed clutch 17, so that the power transmission between the input shaft 9 and the gear 10 becomes reversible, and the effect of engine braking at the first speed stage is attained.

Further, numerals 18 and 19 indicate respective second speed gears, and the second speed gear 19 is held in mesh with the other second speed gear 18. The second speed gear 19 is formed unitarily with the output shaft 13. The gear 18 has the power of the input shaft 9 transmitted thereto by a second speed clutch 20.

Likewise to the first speed clutch 17, the second speed clutch 20 is hydraulically actuated to bring the input shaft 9 and the gear 18 into or out of engagement. Upon the engagement, the power of the input shaft 9 is transmitted to the second speed gear 19 through the second speed clutch 20 as well as the gear 18. Thus, the power transmission path of the second speed stage is formed by the engagement of the second speed clutch 20.

Further, numerals 21 and 22 indicate respective third speed gears. One third speed gear 21 is slidingly fitted on the input shaft 9, and has power transmitted from the input shaft 9 upon the engagement of a synchronous clutch 23 which is brought into or out of engagement therewith by hydraulic actuation. The other third speed gear 22 meshing with the one speed gear 21 is formed unitarily with the output shaft 13, likewise to the second speed gear 19. Accordingly, the power transmission path of the third speed stage is formed by the engagement of the synchronous clutch 23.

In interlocking with the R range reverse selecting operation of the selector switch 62 (FIG. 3), the slide gear 14 slides toward the reverse gear 24 in the axial direction, to release the mesh of the mesh teeth 15 and 16 and to bring the slide gear 14 into mesh with the reverse gear 24. Thus, the power transmission is effected along the first speed gears 10 and 11, the gear 11a, the reverse gear 24, the slide gear 14 and the output shaft 13, and the reverse stage thereby is established.

Figure 2:
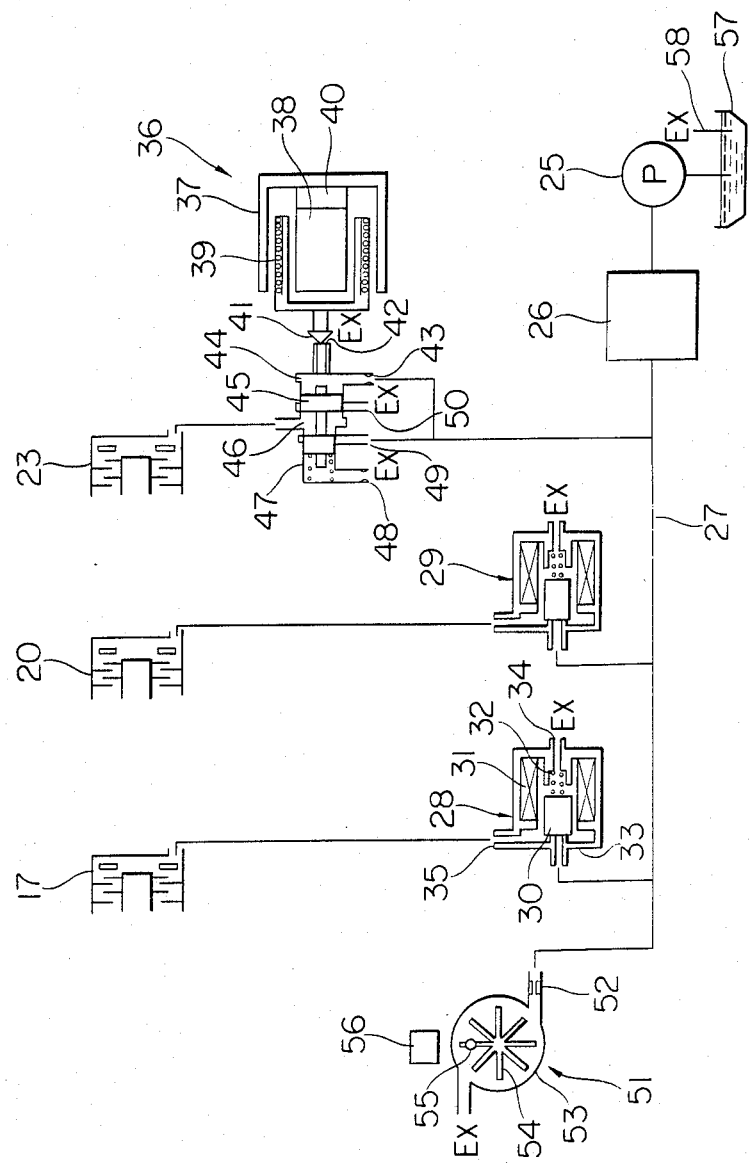
FIG. 2 is a diagram of a hydraulic control circuit in the speed change control unit of the automatic transmission for automobiles.

FIG. 2 is a diagram which shows an example of a hydraulic control circuit in the automatic transmission of the construction shown in FIG. 1. In FIG. 2, the same parts as in FIG. 1 are assigned the same symbols.

In FIG. 2, numeral 25 designates a hydraulic pump. It is driven by an electric motor, the power source of which is the engine or the battery of the automobile, and it draws up oil from an oil reservoir 57 so as to supply high pressure oil for actuating the respective hydraulic clutches. The oil pressure of the hydraulic pump 25 is such that a hydraulic line 27 is held at a substantially constant oil pressure by an oil pressure regulator valve 26.

Numerals 28 and 29 indicate control valves for bringing into engagement or releasing the first clutch 17 and the second clutch 20, respectively. Since both the control valves 28 and 29 have the same construction, the construction and operation will be described as to only the control valve 28.

In the control valve 28, numeral 30 indicates a plunger valve, numeral 31 a coil, and numeral 32 a return spring. In the state in which no current is flowing through the coil 31, the plunger valve 30 closes an input port 33 connected to the hydraulic line 27, while it opens an oil exhaust port 34, by means of the return spring 32.

Accordingly, an output port 35 is brought into communication with the oil exhaust port 34, and pressure oil in the first speed clutch 17 is exhausted, so that the first speed clutch 17 is released.

Subsequently, when the coil 31 is energized, the plunger valve 30 is attracted against the urging of the return spring 32, to open the input port 33 and to simultaneously close the oil exhaust port 34.

As a result, the hydraulic line 27 and the output port 35 are brought into communication, and the pressure oil is supplied to the first speed clutch 17 to bring this clutch into engagement.

The second speed clutch 20 operates similarly to the first speed clutch 17 described above. The second speed clutch 20 is brought into engagement upon the energization of the control valve 29, and it is released upon the interruption of current.

The oil exhaust port 34 of the control valve 28 and the oil exhaust port of the control valve 29 (both being denoted by EX) are connected to an oil exhaust pipe 58. All the ports EX in FIG. 2 are connected to the oil exhaust pipe 58 or are held in communication with the oil reservoir 57 through other passages.

Shown at numeral 36 is an oil pressure control valve by which an oil pressure to be fed to the synchronous clutch 23 is electrically adjusted in order to control the transmission torque of the synchronous clutch 23. This oil pressure control valve 36 is constructed of a yoke 37, a pole 38, a control coil 39 and a permanent magnet 40.

The yoke 37 is formed in the shape of a bottomed tube, and the pole 38 is disposed at the central part of the bottom of the yoke. An annular gap is defined by the yoke 37 and the pole 38. The control coil 39 is inserted in the annular gap. The control coil 39 is held in the annular gap in a manner to be movable in the axial direction thereof. The permanent magnet 40 is interposed between the pole 38 and the yoke 37.

A radial magnetic field is established by the permanent magnet 40, the yoke 37 and the pole 38. Owing to the radial magnetic field, the control coil 39 generates an axial force which is substantially proportional to a control current flowing therethrough.

A valve 41 is formed unitarily with the control coil 39. Upon the generation of the axial force in the control coil 39, the valve 41 is urged toward engagement with a valve seat 42, and also the urging force is substantially proportional to the control current.

On the other hand, the oil pressure of the hydraulic line 27 is fed into a control oil pressure chamber 44 through an orifice 43. An oil pressure in the control oil pressure chamber 44 rises until it is balanced with the urging force of the valve 41. It becomes a pressure valve which is substantially proportional to the control current flowing through the control coil 39.

This control oil pressure balances with the axial force of a spool 45 based on an oil pressure in an output oil pressure chamber 46. Accordingly, the oil pressure of the output oil pressure chamber 46 varies substantially in proportion to the control current flowing through the control coil 39. The output oil pressure chamber 46 is defined by the spool 45 which has two lands of unequal effective areas. The oil pressure of the output oil pressure chamber 46 becomes the oil pressure of the synchronous clutch 23 connected thereto, with the result that the transmission torque of the synchronous clutch 23 becomes a value proportional to the control current of the control coil 39.

Numeral 47 designates a spring for biasing the spool 45, numeral 48 designates an orifice for stabilizing the control operation, numeral 49 designates an input/output port, and numeral 50 designates an oil exhaust port.

Numeral 51 designates a flow rate sensor, which measures through an orifice 52, the flow rate of the working oil flowing from the hydraulic line 27 under substantially the fixed pressure. The flow rate sensor 51 is constructed of a rotary impeller 54 which rotates in a casing 53 by receiving a flow of oil from the hydraulic line 27, a magnet 55 which is mounted on a part of the rotary impeller 54, and a switch device 56 which turns "on" and "off" in accordance with the rotation of the magnet 55 and which uses, for example, a reed switch. The switch device 56 generates an electrical output which is proportional to the flow rate through the orifice 52.

Figure 3:
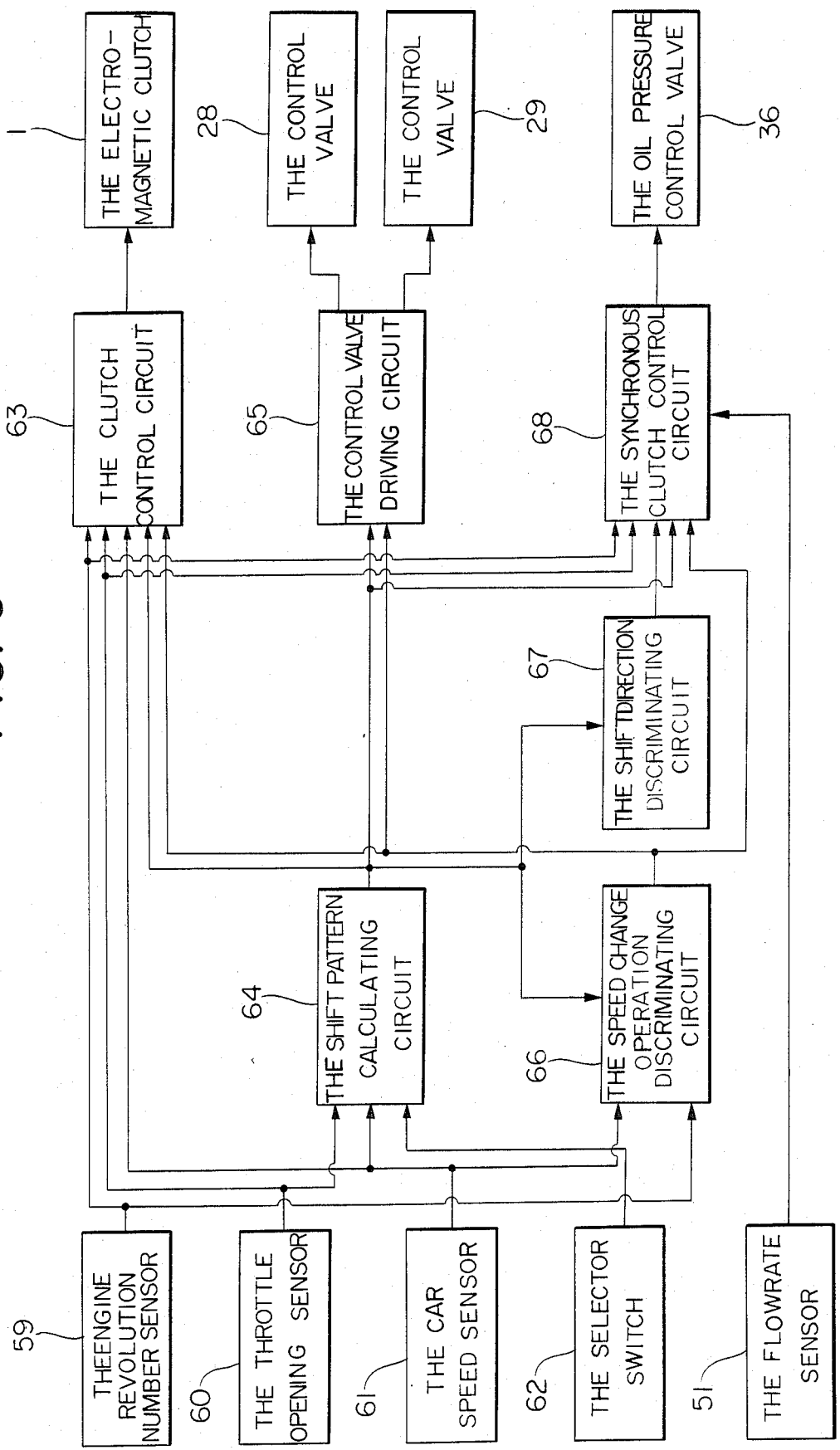
FIG. 3 is a block diagram of an electric control circuit in the speed change control unit of the automatic transmission for automobiles.

FIG. 3 is a block diagram illustrative of an example of an electric control circuit for the automatic transmission which has the construction shown in FIGS. 1 and 2. In FIG. 3, numeral 59 designates an engine speed (revolution rate) sensor which produces an electric signal proportional to the rate of revolutions of the engine, numeral 60 designates a throttle opening sensor which detects the throttle opening of the engine, and numeral 61 a car speed sensor which produces an electric signal proportional to the speed of the automobile.

The selector switch 62, referred to above, is a switch which is operated by the driver of the automobile and which serves to select a desired drive mode. Usually, there are set such drive modes as P (parking), R (reverse), N (neutral), D (drive), 2H (second speed hold) and 1H (first speed hold). An electric signal corresponding to the selected mode is provided.

Further, numeral 63 designates a clutch control circuit which controls the exciting current of the electromagnetic clutch 1 and thus controls the transmission torque to a proper value corresponding to the driving state of the automobile. Clutch control circuit 63 receives the output signals of the engine revolution any speed sensor 59, the throttle opening sensor 60, the car speed sensor 61, a shift pattern calculating circuit 64, and a speed change operation discriminating circuit 66. Thus, at the starting of the automobile, circuit 63 increases the rise of the exciting current of the electromagnetic clutch 1 substantially in proportion to the revolutionary speed of the engine, thereby to realize a smooth starting operation. In addition, it releases the electromagnetic clutch 1 in accordance with a speed change aspect during the speed change operation in which the gear ratio is altered, and it controls the rate of rise of the exciting current in accordance with the load state of the engine after the end of the speed change operation, thereby to moderate the speed change shock.

The shift pattern calculating circuit 64 is a circuit which determines the optimum transmission gear stage corresponding to the driving state of the automobile. As is known, a shift pattern is generally determined by the output signals of the throttle opening sensor 60 and the car speed sensor 61, and it is furnished with a characteristic in which a gear shift point moves to a higher speed side as the throttle opening becomes greater. This fundamental characteristic is modified by the output signal of the selector switch 62, which is the signal of the drive mode selected by the driver of the automobile.

A control valve driving circuit 65 amplifies the output signal of the shift pattern calculating circuit 64 so as to operate the control valve 28 or 29. The control valve 28 operates at the first speed, and the control valve 29 operates at the second speed.

The speed change operation discriminating circuit 66 detects the state of a speed change period from the time of the output change of the shift pattern calculating circuit 64 until the end of the speed change operation. It determines the speed change operation by comparing the output signals of the engine revolution any speed sensor 59 and the car speed sensor 61.

Further, a shift direction discriminating circuit 67 discriminates the changing direction of the output of the shift pattern calculating circuit 64, such as the speed change from the first speed to the second speed or from the second speed to the first speed.

A synchronous clutch control circuit 68 controls the control current of the oil pressure control valve 36 so as to control the transmission torque of the synchronous clutch 23. The operating timing of the synchronous clurch control circuit 68 and the rate of increase of the control current are determined by the output signals of the shift pattern calculating circuit 64, the shift direction discriminating circuit 67, the speed change operation discriminating circuit 66, the engine revolution any speed sensor 59, the throttle opening sensor 60 and the flow rate sensor 51.

As the speed change control unit of the automatic transmission for automobiles according to this invention, an example of the construction of the electric/hydraulic control type 3-stage automatic transmission has been described above. Now, the details of the operation will be described.

When the automobile is stationary, the driver changes the mode of the selector switch 62 from the N range to the D range, the slide gear 14 is axially slid while interlocked with the selector switch 62 and is brought into engagement with the first speed gear 11 owing to the meshing of teeth 15 and 16. Thus, the power transmission path of the first speed state is completed.

At this time, since the automobile is in the stopped state, the shift pattern calculating circuit 64 instructs the first speed stage, and the control valve driving circuit 65 actuates the control valve 28, to bring the first speed clutch 17 into engagement.

In a case where engine braking action is not required in the first speed state, the operation of the first speed clutch 17 is unnecessary because the power transmission is effected by the juxtaposed one-way clutch 12. It is therefore allowed to bring the first speed clutch 17 into engagement only when the selector switch 62 has had the 1H range selected.

When, in the above state in which the power transmission path of the first speed stage has been completed, the accelrator pedal of the automobile is depressed, the revolutionary speed of the engine increases. The clutch control circuit 63 causes the exciting current to flow through the electromagnetic clutch 1, the current increasing substantially in proportion to the number of revolutionary rate of the engine, and thus increases the transmission torque of the electromagnetic clutch 1.

As a result, the automobile begins to move, and the speed thereof rises according to the increase of the throttle opening. When, with the rise of the speed of the automobile, the output of the car speed sensor 61 has exceeded a predetermined value, the output current of the clutch control circuit 63 becomes a fixed exciting current necessary for perfectly couple the electromagnetic clutch 1, irrespective of the revolutionary speed of the engine. Thus, the automobile shifts to the first speed running state in which the electromagnetic clutch 1 undergoes no slip.

When the speed of the automobile has further risen to reach a "first speed→second speed change" car speed which is determined by the output of the throttle opening sensor 60, the shift pattern calculating circuit 64 generates a second speed signal. This output change is discriminated in the shift direction discriminating circuit 67 as well as the speed change operation discriminating circuit 66, and becomes a "first speed→second speed change" operation signal.

As a result, the control valve driving circuit 65 turns "off" the control valve 28 to release the first speed clutch 17, so that the path of power transmission via the one-way clutch 12 is established.

On the other hand, the synchronous clutch control circuit 68 receives the output signals of the engine revolutionary speed number sensor 59, throttle opening sensor 60 and a flow rate sensor 51, simultaneously with the output signal of the shift direction discriminating circuit 67. Depending upon the running state of the automobile, accordingly, circuit 68 raises the control current of the oil pressure control valve 36 and gradually increases the transmission torque of the synchronous clutch 23.

Upon engagement of the synchronous clutch 23, the engine drives the output shaft 13 through the third speed gears 21 and 22. Since the load of the engine increases, the engine revolutionary speed lowers with the engagement of the synchronous clutch 23 and approaches a second speed stage-synchronous revolution rate (output shaft revolutionary speed x second speed gear ratio).

The lowering of the engine revolutionary speed is measured by the speed change operation discriminating circuit 66. When the speed change operation discriminating circuit 66 has detected that the engine revolutionary speed has become substantially equal to the second speed-synchronous revolution rate, the synchronous clutch control circuit 68 turns "off" the control current of the oil pressure control valve 36 to rapidly release the synchronous clutch 23. At the same time, the control valve driving circuit 65 turns "on" the control valve 29 to bring the second speed clutch 20 into engagement. Then, the power transmission path of the second speed stage is completed.

When the engagement of the synchronous clutch 23 at the "first speed→second speed" change is earlier with respect to the engine load state at the speed change, it gives rise to a great speed change shock. Conversely, when it is later, the period of time of the speed change becomes long, and it is therefore feared that the abrasion of the synchronous clutch 23 will quicken to spoil the durability thereof.

The engaging speed of the synchronous clutch 23 is therefore adjusted by the use of the input signals indicating the engine load state in terms of the engine revolutionary speed, the throttle opening, etc., whereby a control characteristic affording the optimum speed change operation is set. Since, however, the internal temperature of the transmission differs depending upon the state of use of the automobile and the viscosity of the working oil changes greatly with temperature, the flow resistance of the hydraulic line changes. With the control receiving only the engine load state, accordingly it is very difficult to maintain the optimum speed change operation at all times.

In this invention, therefore, the flow rate at which the working oil held at a constant pressure flow through the fixed orifice 52 or a corresponding oil passage is detected by the flow rate sensor 51 and the measured value is used for modifying the rise characteristic which has been set in accordance with the engine load state. Thus, the change of the flow resistance of the hydraulic circuit attendant upon the temperature change of the working oil, etc. is compensated for, and a substantially constant speed change operation is attained at all times.

When, in the second speed state, the speed of the automobile has further risen to reach a "second speed→third speed" change point, the shift pattern calculating circuit 64 generates a third speed signal. The signal change is discerned as a "second speed→third speed" up signal by the speed change operation discriminating circuit 66 and the shift direction discriminating circuit 67. The synchronous clutch control circuit 68 raises the control current of the oil pressure control valve 36 in accordance with the output signals of the engine revolution rate sensor 59 and throttle opening sensor 60 and also the output signal of the flow rate sensor 51. Thus, circuit 68 controls the engaging speed of the synchronous clutch 23 in accordance with the load state of the engine and the signal of the flow rate sensor 51, as in the "first speed→second speed" change.

On the other hand, the control valve driving circuit 65 receives a signal delayed by the initial rise time of the synchronous clutch 23, from the speed change operation discriminating circuit 66, and it turns "off" the control valve 29. Thus, while the transmission is kept prevented from falling into the neutral state, it shifts to the third speed stage without any speed change shock.

In the above, the upshifts have been described. Regarding the downshifts of the "third speed→second speed" and "second speed→first speed", the corresponding valves are controlled in accordance with each speed change operation. Simultaneously, the control current of the electromagnetic clutch 1 is temporarily interrupted and the engine revolution number is raised, whereupon the control current of the electromagnetic clutch 1 is increased again and the electromagnetic clutch 1 is coupled again. Thus, a smooth speed change is achieved.

In the above, there has been described in detail an example of application of the invention to an automatic transmission which comprises in combination an electromagnetic clutch and a speed change gear mechanism controlled electrically and hydraulically. However, even when this invention is applied to a transmission of a different type, for example, an automatic transmission which comprises a torque converter and an electric and hydraulic control mechanism in combination, the same effect is attained.

As set forth above, with the speed change control unit of an automatic transmission for automobiles according to this invention, a hydraulic servo for achieving speed change operations is electrically and hydraulically controlled depending upon the operating state of the engine, while the flow rate of working oil having a substantially constant pressure applied thereto and flowing through an orifice is detected so as to control the operating speed of the hydraulic servo in accordance with the flow rate. Therefore, changes in the characteristics of the hydraulic servo ascribable to the temperature change and quality fluctuation of the working oil of the transmission can be compensated for, and a smooth speed change operation is attained at all times.

What is claimed is:

1. An automatic transmission apparatus for an automobile, comprising:

a. means, including a plurality of hydraulic servo devices, for changing the gear ratios of the automobile, operable with pressurized working oil; said changing means including a hydraulic line for carrying the working oil to said hydraulic servo devices, and means for maintaining the working oil in the hydraulic line at a fixed oil pressure; the speed of the gear changes being a function of the pressure applied to the working oil by the servo devices, and the viscosity of the working oil; and b. means for electrically controlling the speed of gear changes by said hydraulic servo devices as a function of the driving state of the automobile, so as to moderate gear shift shocks, said speed controlling means including:

(1) means for measuring the flow rate of the working oil at the constant oil pressure; said flow rate measuring means including a fixed orifice communicating with said hydraulic line, and means for measuring the flow rate of the working oil through said fixed orifice as an indication of the viscosity of the working oil;

(2) means for measuring the driving state of the automobile; and (3) means, responsive to the measurement of the driving state by said driving state measuring means and to the measurements of flow rate by said flow rate measuring means, for electrically controlling the application of pressure to the working oil by one of said hydraulic servo devices during changes of the gears; said pressure controlling means including means for compensating for changes in the viscosity of the working oil as indicated by the flow rate measured by said flow rate measuring means, such that the dependence of the speed of the gear changes on the viscosity of working oil is reduced.

2. An apparatus as in claim 1, wherein said flow rate measuring means comprises a flow rate sensor which generates an electrical output indicative of the flow rate of the working oil, said pressure controlling means being responsive to said electrical output.

3. An apparatus as in claim 2, wherein said flow rate sensor includes a rotary impeller which receives the flow of the working oil through said orifice so as to be rotated thereby, a magnet on said impeller for rotating therewith, and an electric switch disposed adjacent said impeller so as to be turned "on" and "off" by rotation of said magnet thereby.

* * * * *